United States Patent
Thomason et al.

(10) Patent No.: US 10,140,159 B1
(45) Date of Patent: Nov. 27, 2018

(54) SYSTEMS AND METHODS FOR DYNAMIC CREATION OF CONTAINER MANIFESTS

(71) Applicant: Dell Software Inc., Aliso Viejo, CA (US)

(72) Inventors: James Albert Thomason, Las Vegas, NV (US); David Mortman, Worthington, OH (US); Campbell McNeill, Austin, TX (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 15/061,241

(22) Filed: Mar. 4, 2016

(51) Int. Cl.
*G06F 9/455* (2018.01)
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | |
|---|---|---|
| 6,629,150 B1 | 9/2003 | Huded |
| 7,606,917 B1 | 10/2009 | Blagoev et al. |
| 8,037,187 B2 | 10/2011 | Dawson et al. |
| 8,621,069 B1 | 12/2013 | Tompkins |
| 8,886,639 B2 | 11/2014 | Puterman-Sobe et al. |
| 9,009,840 B1 | 4/2015 | Stickle |
| 9,239,730 B2 | 1/2016 | Mizrahi et al. |
| 2003/0097422 A1 | 5/2003 | Richards et al. |
| 2003/0110242 A1 | 6/2003 | Brown et al. |
| 2009/0049521 A1 | 2/2009 | Le Rouzic et al. |
| 2009/0260007 A1* | 10/2009 | Beaty .................... G06F 9/5077 718/1 |
| 2009/0288084 A1* | 11/2009 | Astete ................. G06F 9/45533 718/1 |
| 2010/0064299 A1 | 3/2010 | Kacin et al. |
| 2010/0114825 A1* | 5/2010 | Siddegowda ............. G06F 8/71 707/638 |
| 2010/0250712 A1 | 9/2010 | Ellison et al. |
| 2010/0332401 A1 | 12/2010 | Prahlad et al. |
| 2011/0004878 A1 | 1/2011 | Divoux |
| 2011/0029479 A1 | 2/2011 | Novak et al. |
| 2011/0296370 A1* | 12/2011 | Ferris ........................ G06F 8/71 717/100 |
| 2012/0042198 A1 | 2/2012 | Han et al. |

(Continued)

OTHER PUBLICATIONS

U.S. Appl. No. 15/061,260, Thomason et al.
U.S. Appl. No. 14/931,454, Mullin et al.
U.S. Appl. No. 15/061,209, Mortman et al.
U.S. Appl. No. 15/084,677, Slawomir.

(Continued)

*Primary Examiner* — Dong U Kim
(74) *Attorney, Agent, or Firm* — Winstead PC

(57) ABSTRACT

In one embodiment, a method is performed by a computer system. The method includes determining a base state of a particular container, wherein the base state is represented by a base image. The method further includes determining a target state of the particular container, wherein the target state is represented by a deployment of the particular container. In addition, the method includes determining a set of commands to transition from the base state to the target state. Further, the method includes generating a manifest for the target state of the particular container, the manifest comprising the determined set of commands to reach the target state.

11 Claims, 5 Drawing Sheets

(56) References Cited

U.S. PATENT DOCUMENTS

| | | |
|---|---|---|
| 2012/0159523 A1 | 6/2012 | Kulkarni et al. |
| 2013/0047147 A1* | 2/2013 | McNeill .............. G06F 9/45533 717/173 |
| 2013/0238785 A1 | 9/2013 | Hawk et al. |
| 2014/0075019 A1 | 3/2014 | Mordani et al. |
| 2014/0096133 A1 | 4/2014 | Kundu et al. |
| 2014/0122670 A1 | 5/2014 | Levy et al. |
| 2014/0143422 A1 | 5/2014 | Joseph et al. |
| 2014/0196028 A1 | 7/2014 | MacPherson et al. |
| 2015/0026346 A1 | 1/2015 | Yoon et al. |
| 2015/0242197 A1 | 8/2015 | Alfonso et al. |
| 2016/0092250 A1 | 3/2016 | Wagner et al. |
| 2016/0182315 A1 | 6/2016 | Salokanto et al. |
| 2016/0261716 A1 | 9/2016 | Khalaf et al. |
| 2016/0294559 A1 | 10/2016 | Dabak et al. |
| 2016/0378518 A1 | 12/2016 | Antony et al. |
| 2016/0381075 A1 | 12/2016 | Goyal et al. |
| 2017/0063722 A1 | 3/2017 | Cropper et al. |
| 2017/0199770 A1 | 7/2017 | Peteva et al. |
| 2017/0279770 A1 | 9/2017 | Woolward |

OTHER PUBLICATIONS

Collins, Kurt; "When to Use Containers or Virtual Machines, and Why"; http://www.theplatform.net/2015/08/06/containers-versus-virtual-machines-when-to-use- . . . ; Aug. 6, 2015; 3 pages.

Patrizio, Andy; "Virtualization vs. Containers: What you Need to Know"; http://www.datamation.com/data-center/virtualization-vs.-containers-what-you-need-to-kn . . . ; Apr. 10, 2015; 3 pages.

Liang, Sheng; "Introducting RancherVM: Package and Run Virtual Machines as Docker Containers"; http://rancher.com/introducing-ranchervm-package-and-run-virtual-machines-as-docker-c . . . ; Apr. 16, 2015; 6 pages.

Dell Inc.; "Dell Simplifies the Cloud Experience"; http://www.dell.com/learn/us/en/uscorp1/secure/2014-11-05-dell-simplify-transform-clou . . . ; Nov. 5, 2014; 3 pages.

Egan, Roger; "Docker Joins Dell's Multi-Cloud Roadmap"; https://blog.docker.com/tag/dell/; Nov. 5, 2014; 4 pages.

Sankar, Anand Mani; "Containers (Docker): A Disruptive Force in Cloud Computing"; http://anandmanisankar.com/posts/container-docker-PaaS-microservices/; Mar. 28, 2015; 13 pages.

Gadde, Ravi; "Kube-Scheduler"; https://github.com/ravigadde/kube-scheduler/blob/master/docs/design/security.md; Jul. 27, 2015; 4 pages.

* cited by examiner

SYSTEMS AND METHODS FOR DYNAMIC CREATION OF CONTAINER MANIFESTS

BACKGROUND

Technical Field

The present disclosure relates generally to application management and more particularly, but not by way of limitation, to systems and methods for manifest creation.

History of Related Art

Virtualization is often used to allocate finite hardware resources among multiple users. An example of virtualization involves the use of containers. While altering a container is often simple to accomplish, tracking changes to containers is not as straightforward.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes determining a base state of a particular container, wherein the base state is represented by a base image. The method further includes determining a target state of the particular container, wherein the target state is represented by a deployment of the particular container. In addition, the method includes determining a set of commands to transition from the base state to the target state. Further, the method includes generating a manifest for the target state of the particular container, the manifest comprising the determined set of commands to reach the target state.

In one embodiment, an information handling system includes a processor. The processor is operable to implement a method. The method includes determining a base state of a particular container, wherein the base state is represented by a base image. The method further includes determining a target state of the particular container, wherein the target state is represented by a deployment of the particular container. In addition, the method includes determining a set of commands to transition from the base state to the target state. Further, the method includes generating a manifest for the target state of the particular container, the manifest comprising the determined set of commands to reach the target state.

In one embodiment, a computer-program product includes a non-transitory computer-usable medium having computer-readable program code embodied therein. The computer-readable program code is adapted to be executed to implement a method. The method includes determining a base state of a particular container, wherein the base state is represented by a base image. The method further includes determining a target state of the particular container, wherein the target state is represented by a deployment of the particular container. In addition, the method includes determining a set of commands to transition from the base state to the target state. Further, the method includes generating a manifest for the target state of the particular container, the manifest comprising the determined set of commands to reach the target state.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1A:
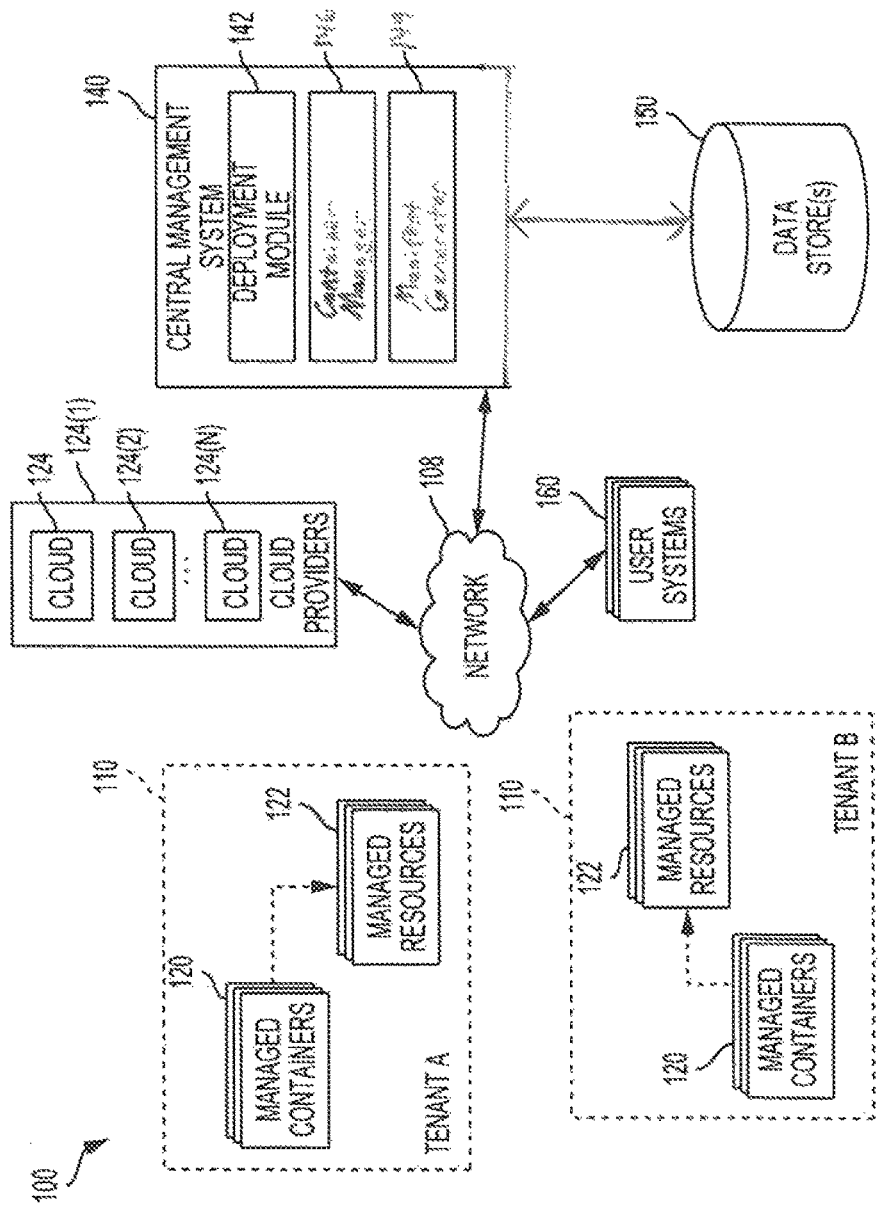
FIG. 1A illustrates an example computing environment for implementing a central management system.

In various embodiments, a virtualized computer system can include one or more host servers that are implemented with one or more physical computing devices. In some cases, the host servers can host one or more virtual machines executing on top of a virtualization layer. The virtualization layer may include, for example, a hypervisor that decouples the physical hardware of the host server from the operating systems of the virtual machines. Such abstraction allows, for example, for multiple virtual machines with different operating systems and applications to run in isolation or substantially in isolation on the same physical machine. Some or all virtual machines can include a guest operating system and associated applications.

In certain embodiments, containers can be used to reduce overhead and improve performance relative to virtual machines. In general, operating systems can include kernel space and user space. The kernel space can correspond to a protected area of memory where an operating system kernel performs tasks such as executing processes and handling interrupts. User space can correspond to an area of memory where user-specific tasks are performed (e.g., running programs in a graphical user interface (GUI)). In general, one of the ways in which containers are distinct from virtual machines is that containers can be used to allow multiple isolated user-space instances on a same operating system, thereby resulting in multiple users sharing the same kernel space. Examples of container formats include, but are not limited to, Docker and Rocket.

In the case of containers, there is no need for a separate kernel to be loaded for each user session. Thus, as a general matter, containers use fewer physical resources (e.g., memory and processor) than virtual machines executing similar workloads. However, containers introduce various technical problems. For example, a container may originally have a base state as represented by a base image of the container and then be altered or managed to yield a new state. The new state, which may be a target state for future deployments of the container, may not be reproducible. Rather, future deployments of the container may correspond to the base state of the container as represented by a stored image for the container. This can complicate container management and require extensive manual configuration and intervention.

The present disclosure describes examples of dynamically generating build manifests for containers. In certain embodiments, a build manifest for a target state of a given container can be automatically generated, for example, by determining a set of commands to transition from a base state of the container to the target state. Advantageously, in certain embodiments, the build manifest can thereafter be leveraged to deploy the container in the target state without requiring administrator configuration.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1A illustrates an example computing environment 100 for implementing a central management system 140. The computing environment 100 includes the central management system 140, tenant systems 110, cloud-provider systems 124, user systems 160 and one or more data stores 150, each of which is operable to communicate over a network 108. The network 108 may be a private network, a public network, a local or wide area network, a portion of the Internet, combinations of the same, and/or the like.

In certain embodiments, the central management system 140 can centrally manage container-based deployments of applications for its tenants. In many cases, an application can be distributed across multiple containers with each container providing a microservice in support of the application. In general, containers of an application can be deployed on managed resources of the central management system 140. As will be described in greater detail below, the managed resources can reside on the cloud-provider systems 124.

In particular, in the computing environment 100, the tenant systems 110 can be served by the central management system 140. The tenant systems 110 can each be considered an abstraction of actual deployments on one or more the cloud-provider systems 110 for particular tenants. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the systems 110 or owners/operators thereof, in addition to having its ordinary meaning, the term "tenant" can, but need not, refer to tenancy in a multitenant software architecture.

The cloud-provider systems 124 are shown to include a cloud-provider system 124(1), a cloud-provider system 124(2) and a cloud-provider system 124(N). It should be appreciated that three cloud-provider systems are shown among the cloud-provider systems 124 only for illustrative purposes. In various implementations, any number of cloud-provider systems can be included among the cloud-provider systems 124.

In a typical embodiment, the cloud-provider systems 124 each provide hardware and/or software computing resources as a service. In various cases, the resources provided by the cloud-provider systems can include computers (e.g., physical computers such as host servers), raw (block) and file-based storage, firewalls, load balancers, internet protocol (IP) addresses, virtual local area networks (VLANs), software bundles, etc. In some cases, the resources offered by the cloud-provider systems 124 can be offered according to deployment models defined by specific business, operational and technical requirements. For example, the cloud-provider systems can include cloud-based hosting services such as the Azure™ service provided by Microsoft® or the EC2™ platform provided by Amazon®.

More specifically, the tenant systems 110 can include one or more managed containers 120 that are deployed on one or more managed resources 122. In some embodiments, the managed resources 122 can be virtual machines as described in relation to U.S. patent application Ser. No. 14/931,454 ("the '454 application"). Also as described in the '454 application, the managed resources 122 can include container-management agents that function to facilitate management and control of the managed containers 120 by a central management system such as the central management system 140. The '454 application is hereby incorporated by reference.

In some embodiments, each managed resource can be tenant-specific such that each managed resource only includes containers of a particular tenant. In these embodiments, virtual machines can be used to be provide additional isolation between containers of disparate tenants. In other embodiments, containers of multiple tenants can be permitted to share resources such as, for example, a virtual machine. In these embodiments, the managed resources 122 shown in relation to Tenant A, for example, can at least partially overlap the managed resources 122 shown in relation to Tenant B.

In the illustrated embodiment, the central management system 140 can include a deployment module 142, a container manager 146 and a manifest generator 149. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the computing environment 100 may itself be hosted on a cloud-provider system such as, for example, one of the cloud-provider systems 124.

In certain embodiments, features of the components of the central management system 140 can be made accessible over an interface to the user systems 160. The user systems 160 can include any type of computing device, including information handling systems such as desktops, laptops, tablets, smartphones, PDAs, to name a few. The user systems 160 can be operated by users associated with the tenants or by other users.

The deployment module 142 can supervise and cause container-based deployment of an application on one or more of the cloud-provider systems 124. As described previously, an application can include interrelated containers that each provides a microservice in support of the application. In general, the deployment module 142 can interact with the cloud-provider systems 124 to cause deployment of containers of an application on cloud resources. In some cases, the functionality of the deployment module 142 can include causing a target virtual machine to be deployed and provisioning a target virtual machine with a container-execution engine which enables user-space isolation for multiple containers. In some cases, the deployment module 142 can publish a configuration interface to the user systems 160, for example, for administrators, super users or other users (e.g., of a particular tenant) to select or specify such commands. In various embodiments, the deployment module 142 can store a command set for multiple container formats and platforms.

The container manager 146 can serve to manage containers such as, for example, the managed containers 120, for tenants. In certain embodiments, the container manager 146 can issue commands to control operation of containers. In general, the container manager 146 can be considered an abstraction of what can potentially be many applications available to manage the managed containers 120. In various embodiments, each of these applications can include or generate audit trails of executed commands.

For example, various commands can start or stop containers, perform configuration management, add or remove permissioned users to a container, mount disks, combinations of same and/or the like. In some cases, the container manager 146 can publish a configuration interface to the user systems 160, for example, for administrators, super users or other users (e.g., of a particular tenant) to select or specify such commands (e.g., using a command-line interface). The commands can include, for example, path-related commands, "get" commands, install commands, library-related commands, "run" commands, etc. In some embodiments, the container manager 146 can cause such commands to be issued over an established connection to container-management agents resident on virtual machines of the cloud-provider systems 124.

The manifest generator 149 can generate manifests for containers. The container manifest of a given container can include a listing of items or files in the container, one or more digital signatures, hashes of each file or item listed in the container, etc. In some embodiments, the container manifest can include a digital signature of a source of each file or item listed in the container manifest. In other embodiments, the container manifest can include a signature of a source of the container manifest as a whole. Additionally, containers can include commands to create a given container. As will be described in greater detail with respect to FIG. 3, the manifest generator 149 can determine commands to transition a container from a base state to a target state. The manifest generator 149 can generate a manifest that includes the determined commands as part of the manifest. In that way, when the container is deployed using the generated manifest, the container can be deployed in its target state. An example will be described in relation to FIG. 3.

In general, the one or more data stores 150 can include any information collected, stored or used by the central management system 140. For example, in various embodiments, the one or more data stores 150 can include container images, deployment settings for applications (e.g., on a tenant-specific and/or application-specific basis), applications for deployment, metadata for applications to be deployed (e.g., metadata which indicates interrelated containers of an application), combinations of the same and/or the like. In certain embodiments, data stored in the one or more data stores 150 can take the form of repositories, flat files, databases, etc. An example of the data store(s) 150 will be described in greater detail in relation to FIG. 1B.

Figure 1B:
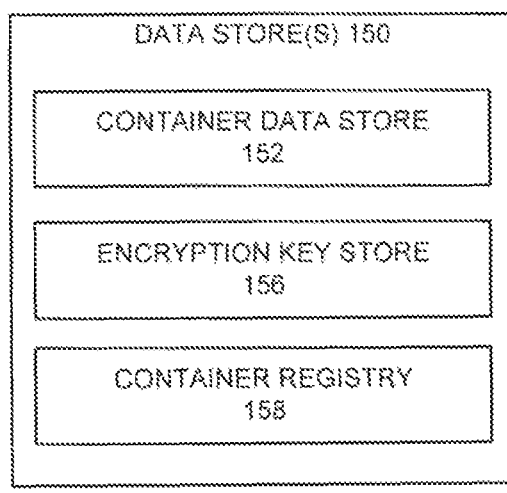
FIG. 1B illustrates an example of a data store.

FIG. 1B illustrates an example of the data store(s) 150 of FIG. 1A. The data store(s) 150 is shown to include a container data store 152, an encryption key store 156 and a container registry 158. The container data store 152 can include an internal or external repository (or a combination of internal and external repositories) in which containers are stored. In an example, the containers of the container data store 152 can include a container image and a container manifest. The container manifest of a given container can include any of the information described above. More particularly, the container manifests can, in many cases, be built by the manifest generator 149 of FIG. 1A.

The encryption key store 156 can include security keys used to validate signatures contained in container manifests. The container registry 158 can include information about containers that are known to an organization, attributes of those containers, deployment settings, combinations of same and/or the like.

Figure 2:
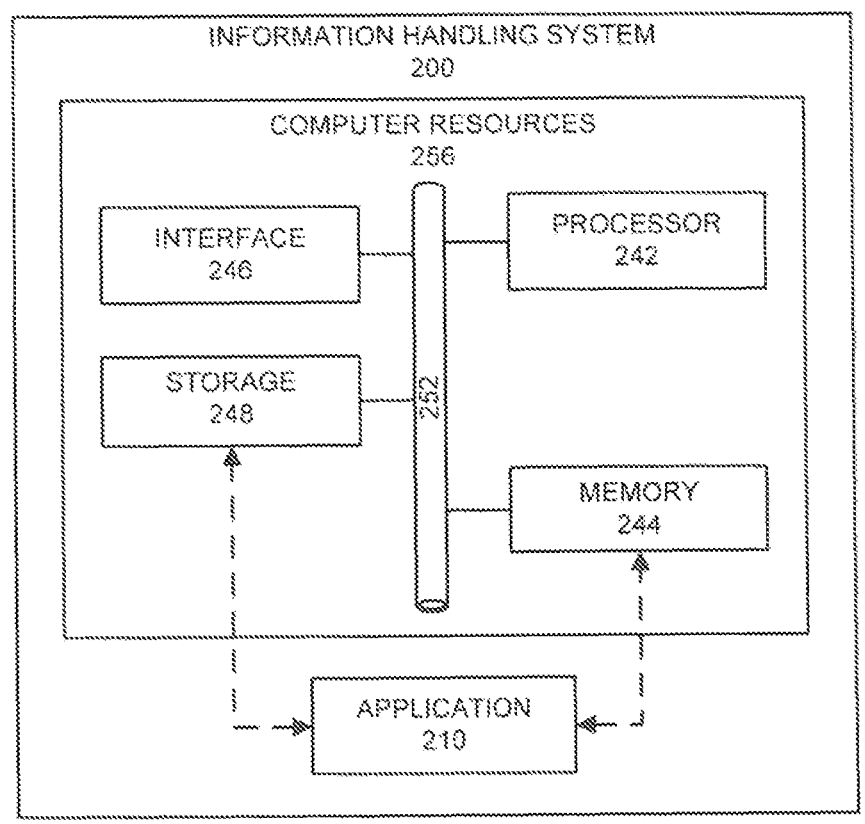
FIG. 2 illustrates an example of an information handling system.

FIG. 2 illustrates an example of an information handling system 200 that, in some cases, can be representative, for example, of the tenant systems 110, a host server, the user systems 160 and/or the central management system 140 of FIG. 1A. The information handling system 200 includes an application 210 operable to execute on computer resources 256. The application 210 can be similar, for example, to the deployment module 142, the container manager 146 and/or the manifest generator 149. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 210. Such functionality may include providing various features discussed herein. In particular embodiments, processor 242 may include hardware for executing instructions, such as those making up the application 210. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
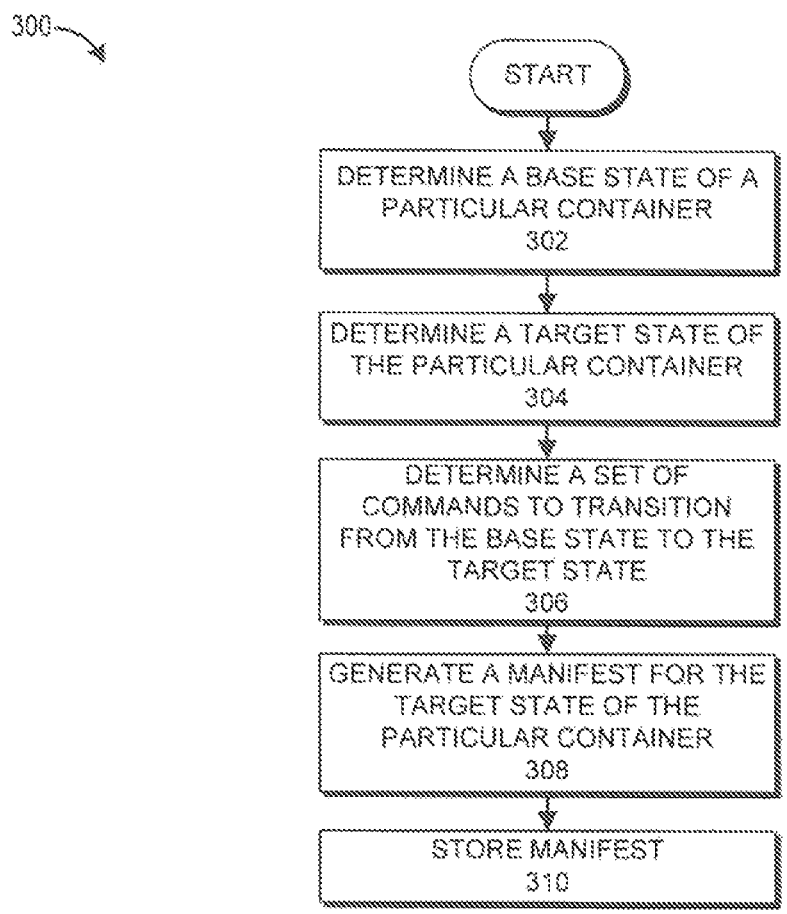
FIG. 3 illustrates an example of a process for dynamically generating a container manifest.

FIG. 3 illustrates an example of a process 300 for dynamically generating a container manifest for a particular container. In certain embodiments, the process 300 can be triggered on-demand by an administrator, super user or other user (e.g., via the user systems 160 in communication with the manifest generator 149, both of FIG. 1A). The process 300 can be implemented by any system that can process data. For example, the process 300, in whole or in part, can be implemented by one or more of the deployment module 142, the container manager 146 and/or the manifest generator 149. In some cases, the process 300 can be performed generally by the central management system 140 or the computing environment 100. Although any number of systems, in whole or in part, can implement the process 300, to simplify discussion, the process 300 will be described in relation to particular components or systems of the computing environment 100 of FIG. 1A.

At block 302, the manifest generator 149 determines a base state of the particular container. In certain embodiments, the base state can be represented by a base image, or container image, of the particular container in the container data store 152 of FIG. 1B. In these embodiments, the base state of the particular container can be considered to correspond to the base image.

At block 304, the manifest generator 149 determines a target state of the particular container. In a typical embodiment, the target state can correspond to a later deployment of the particular container, another image representing such a deployment, etc. In general, the target state represents the container after container management has been applied using, for example, the container manager 146. As described previously, the container manager 146 can, in many cases, be representative of a plurality of management applications or methodologies. Thus, in many cases, the target state can result from the execution of commands issued by multiple management applications.

At block 306, the manifest generator 149 determines a set of commands to transition the particular container from the base state to the target state. In an example, as part of the block 306, the manifest generator 149 can determine user commands that were previously executed in relation to the base state in order to reach the target state. The previously-executed user commands can be determined from the container manager 146. According to this example, the manifest generator 149 can identify one or more management applications that are available to manage the particular container. The management application(s) can potentially be selected from an overall set of management applications based on, for example, a container format of the particular container, cloud providers on which the particular container has been deployed and/or other factors. According to this example, the manifest generator 149 can examine audit trails of the identified management application(s) and retrieve, from the audit trails, the previously-executed user commands and the times at which they were executed. In that way, the set of commands determined by the manifest generator 149 can be a time-sequenced listing of previously-executed user commands from the audit trails.

In another example, as part of the block 306, the manifest generator 149 can examine a file system of a deployment of the particular container that corresponds to the target state. The examination can include comparing the file system of the base state to the file system of the target state. Based at least partly on the examination, the manifest generator 149 can discover a plurality of deltas against the base state. Each delta can represent a change that has occurred in the target state relative to the base state, for example, as a result of commands having been applied. Thereafter, the manifest generator 149 can automatically generate delta commands that correspond to, and produce, the deltas. In that way, the delta commands, if executed on the particular container in the base state, would produce the particular container in the target state.

At block 308, the manifest generator 149 generates a build manifest for the target state of the particular container. The build manifest can include, for example, any of the information included the manifest of the base state along with the determined set of commands from block 306. At block 310, the manifest generator 149 stores the generated manifest, for example, in the container data store 152 in relation to the particular container. Advantageously, in certain embodiments, when the particular container is deployed using the generated manifest, the particular container can be automatically deployed in its target state. An example of deploying a container as all or part of an application will be described in relation to FIG. 4.

Figure 4:
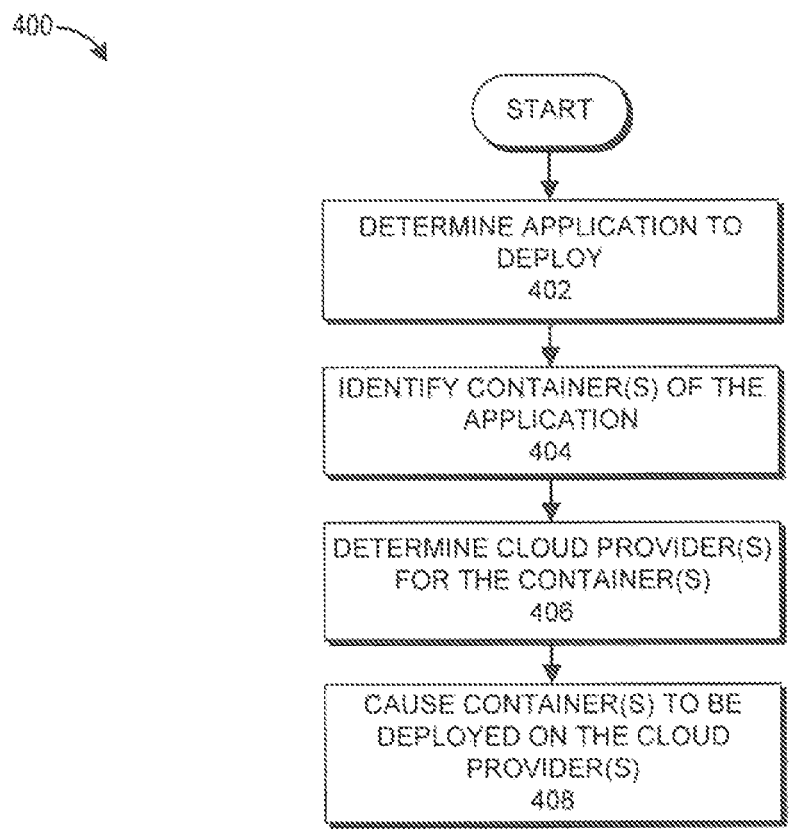
FIG. 4 illustrates an example of a process for deploying an application.

FIG. 4 illustrates an example of a process 400 for deploying an application. In certain embodiments, the process 400 can be triggered on-demand by an administrator, super user or other user for a particular application (e.g., via the user systems 160 in communication with the deployment module 142, both of FIG. 1A). The process 400 can be implemented by any system that can process data. For example, the process 400, in whole or in part, can be implemented by one or more of the deployment module 142 and/or one or more of the cloud-provider systems 124. In some cases, the process 400 can be performed generally by the central management system 140 or the computing environment 100. Although any number of systems, in whole or in part, can implement the process 400, to simplify discussion, the process 400 will be described in relation to particular components or systems of the computing environment 100 of FIG. 1.

At block 402, the deployment module 142 determines an application to deploy. In certain embodiments, the application can be determined as a result of user specification or scheduling via, for example, communication between the user systems 160 and the deployment module 142.

At block 404, the deployment module 142 identifies containers of the application (e.g., one or more containers). In some cases, the containers can be identified from user input. In other cases, the containers can be identified, for example, from metadata related to the application. For example, such metadata can be received from the user systems 160 or accessed from the one or more data stores 150. In some implementations, the block 402 can result in particular container images being identified or built. In some cases, the particular container images can be stored in the one or more data stores 150.

At block 406, the deployment module 142 determines one or more cloud-provider systems of the cloud-provider systems 124 on which to deploy the application. In some implementations, the one or more cloud-provider systems can be determined via user input received, for example, from one of the user systems 160. In other implementations, the one or more cloud-provider systems can be determined via automatic selection based on, for example, stored settings for a tenant to whom the application corresponds, default settings, metadata related to the application, combinations of same and/or the like. In embodiments in which settings and/or metadata are relied upon, such settings and/or metadata can be retrieved from the one or more data stores 150. In some cases, the application can be permitted to span multiple cloud-provider systems. Thus, in some implementations, multiple cloud-provider systems can be determined at the block 406. At block 408, the deployment module 142 causes the identified containers to be deployed on the determined cloud-provider system(s).

It should be appreciated that, although the foregoing examples are described in relation to so-called cloud-provider systems, in various implementations, the principles described herein are not limited to cloud-provider systems. For example, in some implementations, various forms and combinations of on-premises and off-site hosting can be used instead of cloud-provider systems. In these implementations, container-management agents can be used and implemented in the fashion described above to manage containers for applications.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   determining a base state of a particular container, wherein the base state is represented by a base image, and wherein the particular container is configured to execute on an isolated user-space instance in a shared kernel space on an operating system of a resource;
   determining a target state of the particular container, wherein the target state is represented by a deployment of the particular container on a particular resource that has a container-management agent installed thereon, wherein the target state at least partially results from commands, previously issued to the container-management agent, to control operation of the particular container;
   determining a set of commands to transition the particular container from the base state to the target state;
   wherein the determining the set of commands comprises:
      examining an audit trail of a management application for the particular container; and
      retrieving previously-executed user commands from the audit trail, the determined set of commands comprising at least some of the previously-executed user commands;
   generating a build manifest for the target state of the particular container, the build manifest comprising a listing of files in the particular container, a digital signature of a source of at least some of the files, hashes of at least some of the files, and commands to create the particular container, the commands to create the particular container comprising the determined set of commands to transition the particular container from the base state to the target state; and
   automatically deploying the particular container in the target state using the base image and the generated build manifest for the target state.

2. The method of claim 1, wherein the determining the set of commands comprises:
   examining audit trails of a plurality of management applications for the particular container; and
   retrieving the previously-executed user commands from the audit trails.

3. The method of claim 2, comprising, prior to the examining, identifying the plurality of management applications from an overall set of management applications.

4. The method of claim 1, wherein the determining the set of commands comprises:
   examining a file system of the deployment of the particular container; and
   based, at least in part, on the examining, discovering a plurality of deltas against the base state; and
   generating delta commands that produce the plurality of deltas, wherein the set of commands comprise the delta commands.

5. An information handling system comprising a processor and memory, wherein the processor and memory in combination are operable to implement a method comprising:
   determining a base state of a particular container, wherein the base state is represented by a base image, and wherein the particular container is configured to execute on an isolated user-space instance in a shared kernel space on an operating system of a resource;
   determining a target state of the particular container, wherein the target state is represented by a deployment of the particular container on a particular resource that has a container-management agent installed thereon, wherein the target state at least partially results from commands, previously issued to the container-management agent, to control operation of the particular container;
   determining a set of commands to transition the particular container from the base state to the target state;
   wherein the determining the set of commands comprises:
      examining an audit trail of a management application for the particular container; and
      retrieving previously-executed user commands from the audit trail, the determined set of commands comprising at least some of the previously-executed user commands;
   generating a build manifest for the target state of the particular container, the build manifest comprising a listing of files in the particular container, a digital signature of a source of at least some of the files, hashes of at least some of the files, and commands to create the particular container, the commands to create the particular container comprising the determined set of commands to transition the particular container from the base state to the target state; and
   automatically deploying the particular container in the target state using the base image and the generated build manifest for the target state.

6. The information handling system of claim 5, wherein the determining the set of commands comprises:
   examining audit trails of a plurality of management applications for the particular container; and
   retrieving the previously-executed user commands from the audit trails.

7. The information handling system of claim 6, the method comprising, prior to the examining, identifying the plurality of management applications from an overall set of management applications.

8. The information handling system of claim 5, wherein the determining the set of commands comprises:
    examining a file system of the deployment of the particular container; and
    based, at least in part, on the examining, discovering a plurality of deltas against the base state; and
    generating delta commands that produce the plurality of deltas, wherein the set of commands comprise the delta commands.

9. A computer-program product comprising a non-transitory computer-usable medium having computer-readable program code embodied therein, the computer-readable program code adapted to be executed to implement a method comprising:
    determining a base state of a particular container, wherein the base state is represented by a base image, and wherein the particular container is configured to execute on an isolated user-space instance in a shared kernel space on an operating system of a resource;
    determining a target state of the particular container, wherein the target state is represented by a deployment of the particular container on a particular resource that has a container-management agent installed thereon, wherein the target state at least partially results from commands, previously issued to the container-management agent, to control operation of the particular container;
    determining a set of commands to transition the particular container from the base state to the target state;
    wherein the determining the set of commands comprises:
        examining an audit trail of a management application for the particular container; and
        retrieving previously-executed user commands from the audit trail, the determined set of commands comprising at least some of the previously-executed user commands;
    generating a build manifest for the target state of the particular container, the build manifest comprising a listing of files in the particular container, a digital signature of a source of at least some of the files, hashes of at least some of the files, and commands to create the particular container, the commands to create the particular container comprising the determined set of commands to transition the particular container from the base state to the target state; and
    automatically deploying the particular container in the target state using the base image and the generated build manifest for the target state.

10. The computer-program product of claim 9, wherein the determining the set of commands comprises:
    examining audit trails of a plurality of management applications for the particular container; and
    retrieving the previously-executed user commands from the audit trails.

11. The computer-program product of claim 9, wherein the determining the set of commands comprises:
    examining a file system of the deployment of the particular container; and
    based, at least in part, on the examining, discovering a plurality of deltas against the base state; and
    generating delta commands that produce the plurality of deltas, wherein the set of commands comprise the delta commands.

\* \* \* \* \*